(12) United States Patent
Klein et al.

(10) Patent No.: US 9,123,003 B2
(45) Date of Patent: Sep. 1, 2015

(54) TOPOLOGIES CORRESPONDING TO MODELS FOR HIERARCHY OF NODES

(75) Inventors: Shlomi Klein, Petach Tikva (IL); Asaf Shechter, Alphraetta, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 449 days.

(21) Appl. No.: 13/161,381

(22) Filed: Jun. 15, 2011

(65) Prior Publication Data

US 2012/0323814 A1    Dec. 20, 2012

(51) Int. Cl.
*G06Q 10/00* (2012.01)
*G06Q 10/06* (2012.01)

(52) U.S. Cl.
CPC .............. *G06Q 10/06* (2013.01); *G06Q 10/067* (2013.01)

(58) Field of Classification Search
CPC .................................................. G06F 17/30554
USPC .................................................. 705/7.11–7.42
See application file for complete search history.

(56) References Cited

U.S. PATENT DOCUMENTS

| 7,688,758 | B2 * | 3/2010 | Denby et al. | 370/254 |
|---|---|---|---|---|
| 2005/0201299 | A1 * | 9/2005 | Radi et al. | 370/254 |
| 2006/0045028 | A1 * | 3/2006 | Hasan et al. | 370/256 |
| 2007/0043511 | A1 * | 2/2007 | Jensen et al. | 702/19 |
| 2007/0153708 | A1 * | 7/2007 | Dominick et al. | 370/254 |
| 2009/0044185 | A1 | 2/2009 | Krivopaltsev | |
| 2009/0116413 | A1 * | 5/2009 | George | 370/256 |
| 2009/0157419 | A1 * | 6/2009 | Bursey | 705/1 |
| 2009/0164508 | A1 * | 6/2009 | Legault et al. | 707/102 |
| 2009/0327105 | A1 | 12/2009 | Moussa et al. | |
| 2010/0114618 | A1 * | 5/2010 | Wilcock et al. | 705/7 |
| 2012/0036484 | A1 * | 2/2012 | Zhang et al. | 715/853 |
| 2012/0221314 | A1 * | 8/2012 | Bourlatchkov et al. | 703/21 |
| 2012/0303396 | A1 * | 11/2012 | Winkler et al. | 705/7.11 |

OTHER PUBLICATIONS

Cisco data sheet for "CiscoWorks LAN Management Solution 2.6," copyright 1992-2006.
T. Yang et al., "Transition to a two-level linear state estimator—Part II: algorithm," IEEE Transactions on Power Systems, vol. 26, No. 1, Feb. 2011.

* cited by examiner

*Primary Examiner* — Sujay Koneru
(74) *Attorney, Agent, or Firm* — Michael A. Dryja

(57) ABSTRACT

A hierarchy of nodes is organized over levels. Each node corresponds to a configuration item. A first topology corresponds to a first model and includes at least a first subset of the hierarchy of nodes. Each node of the first topology has a first calculation unit for the first model. A second topology corresponds to a second model and includes at least a second subset of the hierarchy of nodes. Each node of the second topology has a second calculation unit for the second model.

20 Claims, 3 Drawing Sheets

TOPOLOGIES CORRESPONDING TO MODELS FOR HIERARCHY OF NODES

BACKGROUND

Computing systems can be used to generate and evaluate models. For instance, one example of such a model pertains to business services management (BSM). A model pertaining to BSM may represent the underlying system that is being used to provide a particular type of business service. For example, a business service may be provided by a network of different business entities, computing devices and other computing resources that interact with one another. Evaluating the model may be accomplished to ascertain whether this underlying system is performing properly.

DETAILED DESCRIPTION

As noted in the background section, models that can be generated and evaluated include models pertaining to business services management (BSM) that can represent the underlying systems that are being used to provide various business services. A model pertaining to BSM may include a hierarchy of nodes that are organized over levels. Each node corresponds to a configuration item, which may be a business entity or a different computing device or other type of computing resource of the underlying system represented by the model.

Generally a model pertaining to BSM provides for a certain perspective of looking at, and thus evaluating, the underlying system providing the business service in question. For example, one model may provide a way to determine an aggregate calculation of the average throughput of responding to a request within the system. By comparison, another model may provide a way to determine an aggregate calculation of the average load of such requests within the system.

To achieve these different perspectives, existing modeling approaches duplicate the hierarchy of nodes. Each model has a corresponding hierarchy of nodes, and is evaluated separately. However, this overall redundancy can result in increased overhead in generating, maintaining, and evaluating the models.

By comparison, disclosed herein are techniques to provide different perspectives for looking at, and thus evaluating, the underlying system providing the business service. For example, consider the case where there are two perspectives by which a particular system is to be examined and evaluated. A first topology corresponds to a first model and to a first context of the nodes, and includes a first subset of the hierarchy of nodes. A second topology corresponds to a second model and to a second context of the nodes, and includes a second subset of the hierarchy of nodes. Thus, there is no duplication of the hierarchy itself. Rather, different contexts, to which the two models correspond, are applied to the same hierarchy of nodes.

Each node of the first topology has a first calculation unit for the first model. The first context can be associated with the first calculation units of these nodes. Each node of the second topology has a second calculation unit for the second model. The second context can be associated with the second calculation units of these nodes. When the models are to be evaluated, the first and second calculation units of the first and second contexts can be evaluated within a single computational cycle, which further permits redundancy to be avoided.

Figure 1:
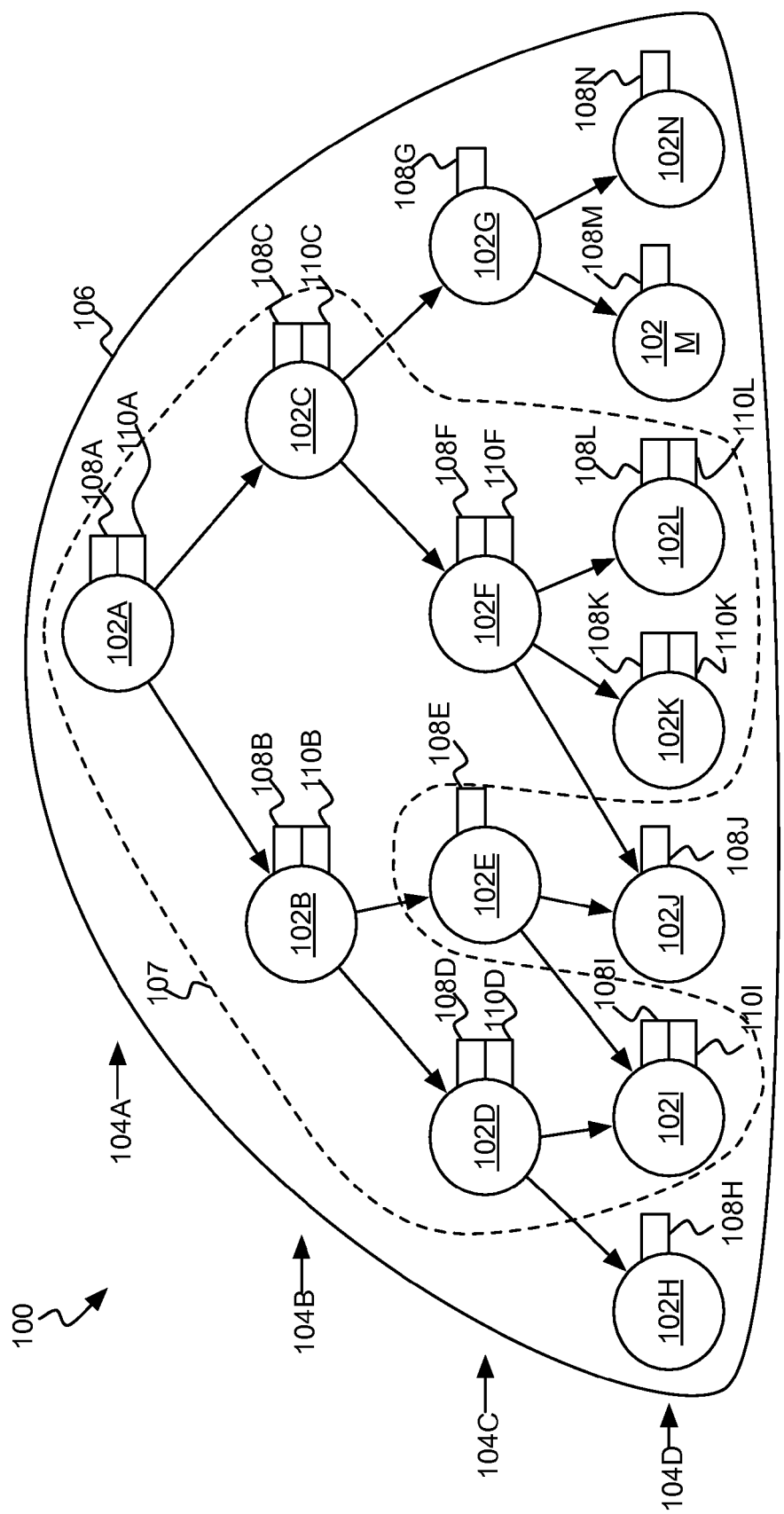
FIG. 1 is a diagram of an example hierarchy of nodes having multiple contexts corresponding to different models.

FIG. 1 shows an example hierarchy 100 of nodes 102A, 102B, . . . , 102N, collectively referred to as the nodes 102, and which are organized over levels 104A, 104B, 104C, and 104D, which are collectively referred to as the levels 104. While there are fourteen nodes 102 in the example hierarchy 100 organized over four levels 104, this is just one example. More generally, there can be more or less nodes 102, and more or less levels 104.

Each node 102 within each level 104 except for the lowest level 104D in the example hierarchy 100 refers to one or more nodes 102 within a lower level 104. The node 102A in the level 104A refers to the nodes 102B and 102C in the level 104B. The node 102B refers to the nodes 102D and 102E in the level 104C, whereas the node 102C refers to the nodes 102F and 102G in the level 104C. The node 102D refers to the nodes 102H and 102I in the level 104D, and the node 102E refers to the nodes 102I and 102J in the level 104D. The node 102F refers to the nodes 102J, 102K, and 102L in the level 104D, and the node 102G refers to the nodes 102M and 102N in the level 104D.

Each node 102 corresponds to a configuration item. A configuration item is a business entity, a computing device, or another type of computing resource of an underlying system that provides a given functionality, such as BSM. For example, each configuration item may correspond to a BSM resource, which may be a business entity or a computing resource like a computing device, a database, a storage device, and so on. Different perspectives of the underlying system are provided by different models to which topologies of different subsets of the hierarchy 100 of nodes 102 correspond.

In the example of FIG. 1, there are two example models: a first model to which a first topology 106 corresponds, and a second model to which a second topology 107 corresponds. More generally, however, there can be more than two topologies corresponding to more than two models. The first topology 106 in the example of FIG. 1 includes a first subset of the nodes 102 made up of all the nodes 102 of the hierarchy 100. The second topology 107 includes a second subset of the nodes 102 including the nodes 102A, 1028, 102C, 102D, 102F, 102I, 102K, and 102L. The first topology 106 is represented in FIG. 1 by a solid line, whereas the second topology 107 is represented in FIG. 1 by a dashed line.

Each node 102 within the first topology 106 has a first calculation unit 108 for the first model. As such, the nodes 102A, 102B, 102C, 102D, 102E, 102F, 102G, 102H, 102I, 102J, 102K, 102L, 102M, and 102N have first calculation units 108A, 108B, 108C, 108D, 108E, 108F, 108G, 108H, 108I, 108J, 108K, 108L, 108M, and 108N, respectively, which are collectively referred to as the first calculation units 108. Each node 102 within the second topology 107 likewise has a second calculation unit 110 for the second model. As such, the nodes 102A, 102B, 102C, 102D, 102F, 102I, 102K, and 102L have second calculation units 110A, 1108, 110C, 110D, 110F, 110I, 110K, and 110L, respectively, which are collectively referred to as the second calculation units 110. There are no second calculation units 110 for the nodes 102 that are not part of the second topology 107, because these nodes 102 are not considered when evaluating the second model to which the second topology 107 corresponds.

A given calculation unit of a certain node 102 for a particular model includes the computations that are performed in relation to the certain node 102 when evaluating the model.

For example, the first calculation unit 108C of the node 102C for the first model includes the computations that are performed in relation to the node 102C when evaluating the first model. Likewise, the second calculation unit 110C of the node 102 for the second model includes the computations that are performed in relation to the node 102C when evaluating the second model.

A particular model is evaluated on a node-by-node basis from a lowest level 104 that includes nodes 102 of the topology to which the particular model corresponds, to a highest level 104 that includes nodes 102 of the topology to which the particular model corresponds. Furthermore, a given calculation unit of a certain node 102 for the particular model is evaluated based on the evaluation results of the given calculation units of the nodes 102 to which the certain node 102 refers within the hierarchy 100 and that are part of the topology to which the particular model corresponds. However, the nodes 102 to which the certain node 102 refers within the hierarchy 100 that are not part of the topology to which the particular model corresponds are not used to evaluate the given calculation unit of the certain node 102 for the particular model.

Two examples are presented to explain the foregoing. Consider the first model to which the first topology 106 corresponds. After the first calculation units 108 of the nodes 102 within the lowest level 104D have been evaluated, the first calculation unit 108D of the node 102D within the level 104C, which is also part of the first topology 106, may be evaluated. The node 102D refers to the nodes 102H and 102I, which are both within the first topology 106. Therefore, the first calculation unit 108D of the node 102D is evaluated based on the evaluation results of the first calculation units 108H and 108I of the nodes 102H and 102I.

However, consider next the second model to which the second topology 107 corresponds. After the second calculation units 110 of the nodes 102 within the lowest level 104D and that are part of the second topology 107 have been evaluated, the first calculation unit of the node 102D within the level 104C, which is also part of the second topology 107, may be evaluated. Although the node 102D refers to the nodes 102H and 102I, the node 102H is not part of the second topology. Therefore, the second calculation unit 110D of the node 102D is evaluated based on the evaluation result of just the second calculation unit 110I of the node 102I.

Figure 2:
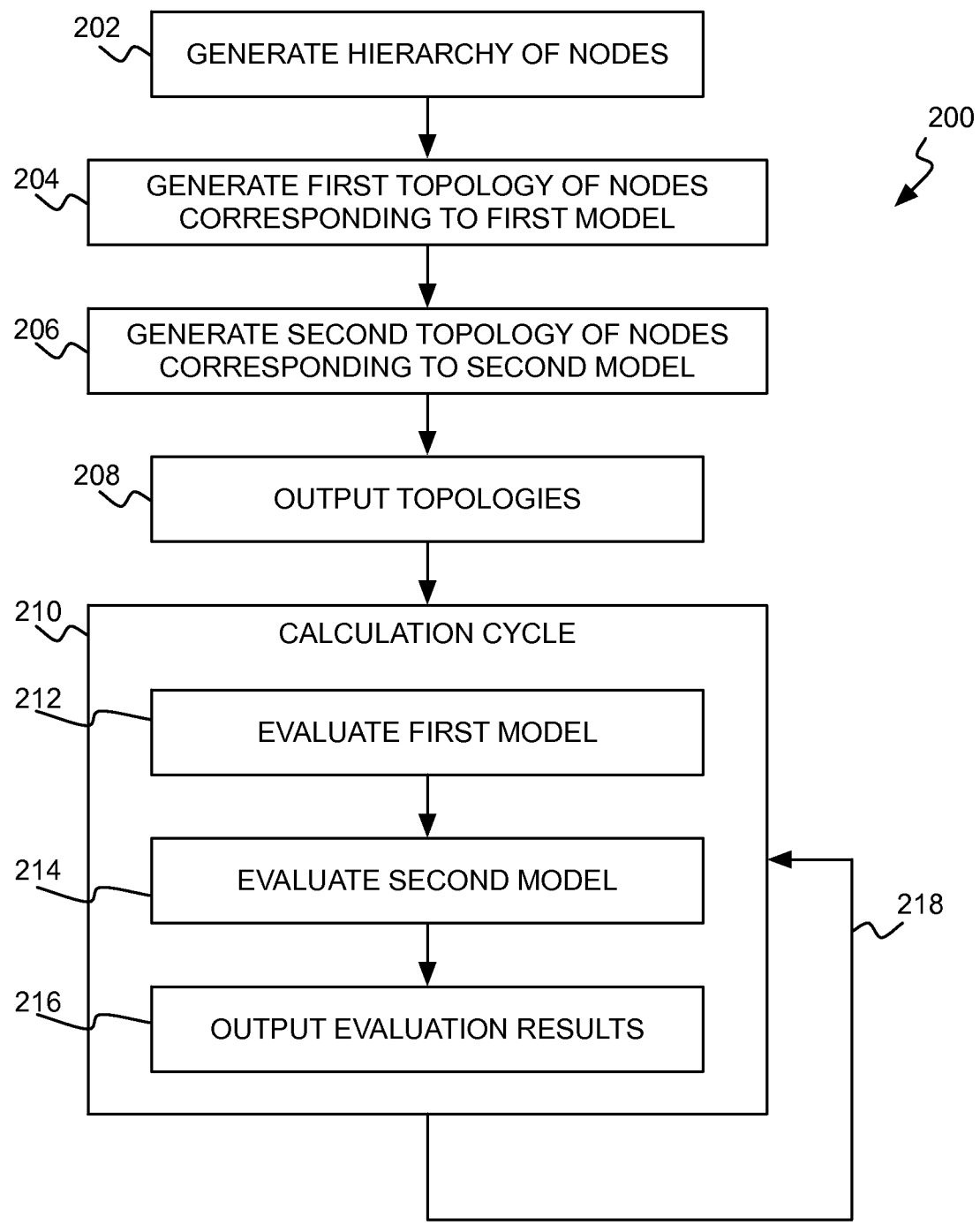
FIG. 2 is a flowchart of an example method.

FIG. 2 shows an example method 200. The method 200 may be performed by a processor, such as a processor of a computing system like a computing device. The method 200 is described in relation to the hierarchy 100 of nodes 102.

The hierarchy 100 of nodes 102 is generated (202). For instance, each node 102 is instantiated or created as representing or corresponding to a configuration item, and relationships among the nodes 102, indicating which nodes 102 refer to which other nodes 102, are also created. Via these relationships, the nodes 102 are thus organized over the levels 104, such that the relationships in effect form the hierarchy 100. The hierarchy 102 of nodes 102 may be generated by permitting a user to instantiate the nodes 102 and to create the relationships among of the nodes 102, such as within a graphical user interface (GUI).

The first topology 106 of the nodes 102, corresponding to the first model, is generated (204). For instance, a user may be permitted to select the subset of nodes 102 that are included within the first topology 106. The user may further be permitted to create or instantiate the first calculation unit 108 for each such node 102 within the first topology 106. The first calculation units 108 effectively define the first model to which the first topology 106 corresponds. In this respect, it is said that generating the first topology 106 can include generating the context corresponding to the first model, where this context is associated with the first calculation unit of each node 102 included within the first topology 106.

The second topology 107 of the nodes 102, corresponding to the second model, is also generated (206). For instance, a user may also be permitted to select the subset of nodes 102 that are included within the second topology 107. The user may further be permitted to create or instantiate the second calculation unit 110 for each such node 102 within the second topology 107. The second calculation units 110 effectively define the second model to which the second topology 107 corresponds. In this respect, it is also said that generating the second topology 107 can include generating the context corresponding to the second model, where this context is associated with the second calculation unit of each node 102 included within the second topology 107.

The topologies that have been generated are output (208). Outputting the topologies can include storing data representing the topologies on a computer-readable data storage medium, displaying graphical representations of the topologies within a GUI, as well as transmitting the data representing the topologies over a network. It is noted that redundancy is avoided even though there are two models, because the hierarchy 100 of nodes 102 is shared by both the first topology 106 and the second topology 107. That is, the contexts corresponding to the models are each associated with the same hierarchy 100 of nodes 102, and not with different hierarchies of nodes.

The following may be periodically performed, such as during each single calculation cycle of a number of such calculation cycles that occur over time (210). The first model is evaluated by evaluating the first calculation unit 108 of each node 102 of the first topology 106 (212), such as on a node-by-node basis from the lowest level 104 to the highest level 104 that includes a node 102 of the first topology 106, as described above. Likewise, the second model is evaluated by evaluating the second calculation unit 110 of each node 102 of the second topology 107 (214), such as on a node-by-node basis from the lowest level 104 to the highest level 104 that includes a node 102 of the second topology 107, as also described above.

Results of the evaluations of the models can be output (216), in the same manner as the topologies 106 and 106 themselves were output in part 208. It is noted that the evaluations of parts 212 and 214 can occur within a single calculation cycle, which aids in avoiding redundancy in evaluating the models. The method 200 can be periodically repeated at least at part 210, as indicated by the arrow 218.

Figure 3:
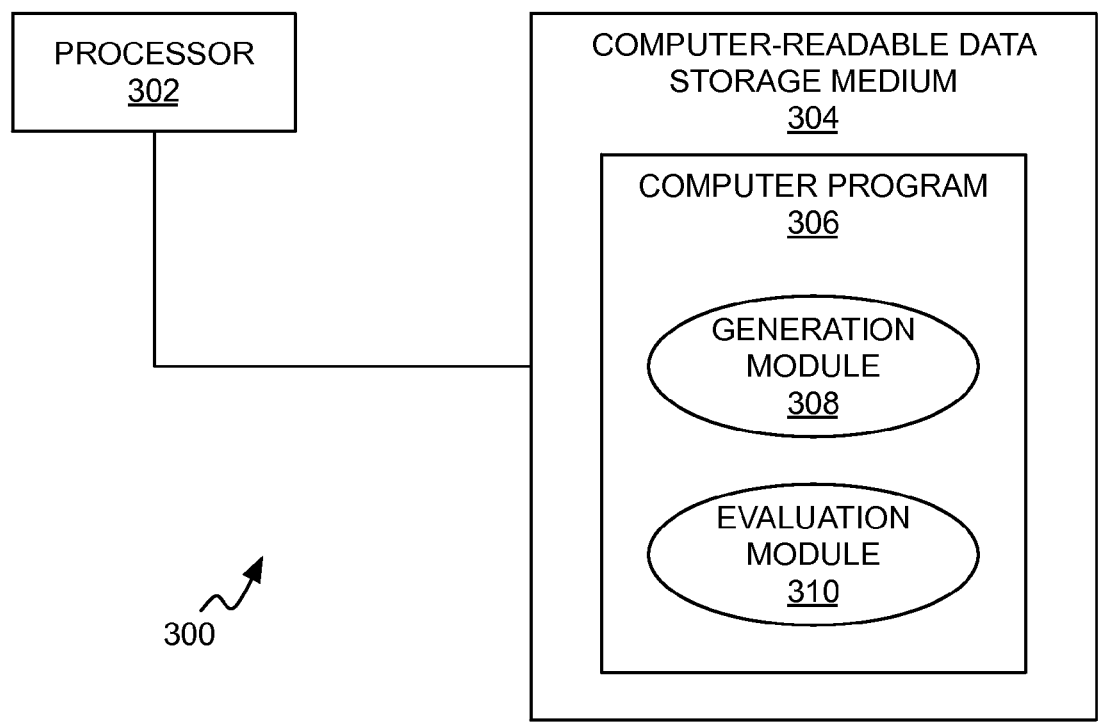
FIG. 3 is a diagram of an example system.

FIG. 3 shows an example system 300. The system 300 may be implemented over one or more computing devices, which may be interconnected to one another over a network. The system 300 includes at least a processor 302 and a computer-readable data storage medium 304. The system 300 can include other components as well, in addition to the processor 302 and the computer-readable medium 304. Examples of computer-readable media include volatile and non-volatile media, such as hard disk drives and other types of magnetic media, optical discs and other types of optical media, semiconductor memory and other types of semiconductor media, and so on.

The computer-readable data storage medium 304 stores a computer program 306. The computer program 306 is executable by the processor 302. The computer program 306 can include two modules: a generation module 308 and an evaluation module 310. The generation module 308 generates the hierarchy of nodes 102 and the topologies 106 and 107, and as such can perform parts 202, 204, 206, and 208 of the method 200. The evaluation module 310 evaluates the models to which the topologies 106 and 107 correspond, and as such can perform parts 210, 212, 214, 216, and 218 of the method 200.

The extension of a hierarchy 100 of nodes 102 to multiple topologies 106 and 107, via corresponding calculation units 108 and 110, has been described at least in some part in relation to underlying systems for which models pertaining to BSM are evaluated. However, the disclosed extension can be applied to other types of models as well. Examples of such other types of models include traffic models, water management models, as well as other types of models.

We claim:

1. A method comprising:
    generating, by a processor of a computing device, a hierarchy of nodes organized over a plurality of levels, each node corresponding to a configuration item, the nodes corresponding to computing resources of a system, the computing resources interacting with one another to provide a business service of the system;
    after generating the hierarchy of nodes, generating, by the processor, a first topology corresponding to a first model, including identifying which of the nodes of the hierarchy to define the first topology as a first subset of the hierarchy of nodes, each node of the first topology having a first calculation unit for the first model, the first topology comprising the nodes of the first subset; and,
    after generating the hierarchy of nodes, generating, by the processor, a second topology using a same hierarchy as was used to generate the first topology, the second topology different than the first topology, corresponding to a second model different than the first model, including identify which of the nodes of the hierarchy to define the second topology as a second subset of the hierarchy of nodes different than the first subset, each node of the second topology having a second calculation unit for the second model, the second topology comprising the nodes of the second subset;
    outputting, by the processor, the first topology and the second topology; and
    determining whether the system is performing properly to provide the business service by evaluating the first model using the first topology and the second model using the second topology, including evaluating the first calculation units of the first topology and the second calculation units of the second topology within a single computational cycle,
    wherein generating the first topology and the second topology from the same hierarchy avoids duplication between the first topology and the first hierarchy and reduces overhead in generating the first topology and the second topology,
    and wherein evaluating the first calculation units and the second calculation units within the single computational cycle reduces redundancy in determining whether the system is performing properly.

2. The method of claim 1, wherein one or more given nodes of the hierarchy are part of both the first topology and the second topology, such that each given node has a first calculation unit for the first model and a second calculation unit for the second model.

3. The method of claim 1, wherein the first topology is different than the second topology, the first model is different than the second model, and the first subset is different than the second subset.

4. The method of claim 1, wherein each node of each level of nodes except for a lowest level refers to one or more nodes of the levels that are lower than the level of the node.

5. The method of claim 1, wherein one or more of:
    generating the hierarchy of nodes comprises permitting a user to instantiate each node, and to create relationships of the nodes, the relationships forming the hierarchy;
    generating the first topology comprises permitting the user to select the first subset of the hierarchy of nodes, and to create the first calculation unit for each node of the first topology;
    generating the second topology comprises permitting the user to select the second subset of the hierarchy of nodes, and to create the second calculation unit for each node of the second topology.

6. The method of claim 1, wherein generating the first topology comprises generating a first context corresponding to the first model, the first context associated with the first calculation unit of each node of the first subset,
    and wherein generating the second topology comprises generating a second context corresponding to the second model, the second context associated with the second calculation unit of each node of the second subset.

7. The method of claim 6, wherein redundancy is avoided due to the hierarchy of nodes being shared by both the first topology and the second topology, such that the first context and the second context are both associated with the hierarchy of nodes and not with different hierarchies of nodes.

8. The method of claim 1, further comprising, within a single calculation cycle:
    evaluating, by the processor, the first model by evaluating the first calculation unit of each node of the first topology;
    evaluating, by the processor, the second model by evaluating the second calculation unit of each node of the second topology; and,
    outputting results of evaluating the first model and the second model.

9. The method of claim 8, wherein redundancy in evaluating the first model and the second model is avoided due to the hierarchy of nodes being shared by both the first topology and the second topology.

10. The method of claim 1, wherein each of the first model and the second model corresponds to a different business services management model for the hierarchy of nodes,
    and wherein the configuration node to which each node corresponds comprises a different business services management resource that is used in the different business services management model to which each of the first model and the second model correspond.

11. A non-transitory computer-readable data storage medium storing a computer program executable by a processor to perform a method comprising:
    evaluating a first model to which a first topology corresponds, the first topology comprising and defined as a first subset of a hierarchy of nodes and generated after the hierarchy of nodes was generated, the hierarchy of nodes organized over a plurality of levels, each node of the hierarchy corresponding to a configuration item, each node of the first topology having a first calculation unit for the first model, the nodes corresponding to computing resources of a system, the computing resources interacting with one another to provide a business service of the system, wherein evaluating the first model includes evaluating the first calculation nodes within a single computational cycle;

evaluating a second model to which a second topology corresponds, the second topology comprising and defined as a second subset of the hierarchy of nodes, generated after the hierarchy of nodes was generated, and generated using a same hierarchy as the first topology uses, each node of the second topology having a second calculation unit for the second model, the second topology different than the first topology, the second model different than the first model, the second subset different than the first subset, wherein evaluating the second model includes evaluating the second calculation nodes within the single computational cycle;

outputting results of evaluating the first model and the second model; and determining whether the system is performing properly to provide the business service using the results, wherein the first topology and the second topology being generated from the same hierarchy avoids duplication between the first topology and the first hierarchy and reduces overhead when the first topology and the second topology are generated, and wherein evaluating the first calculation units and the second calculation units within the single computational cycle reduces redundancy in determining whether the system is performing properly.

12. The non-transitory computer-readable data storage medium of claim 11, wherein the first model and the second model are each evaluated within a single calculation cycle, such that redundancy is avoided due to the hierarchy of nodes being shared by both the first topology and the second topology.

13. The non-transitory computer-readable data storage medium of claim 11, wherein evaluating the first model comprises evaluating the first calculation unit of each node of the first topology, and wherein evaluating the second model comprises evaluating the second calculation unit of each node of the second topology.

14. The non-transitory computer-readable data storage medium of claim 13, wherein evaluating the first calculation unit of each node of the first topology comprises evaluating the first calculation units of the nodes of the first topology on a node-by-node basis from a lowest level of the hierarchy of nodes to a highest level of the hierarchy of nodes, and wherein evaluating the second calculation unit of each node of the second topology comprises evaluating the second calculation units of the nodes of the second topology on a node-by-node basis from the lowest level of the hierarchy of nodes to the highest level of the hierarchy of nodes.

15. A system comprising:

a processor; and, a computer-readable data storage medium to store a computer program executable by the processor, wherein the computer program is to:

generate a first topology corresponding to a first model, including identifying which of a plurality of nodes of a hierarchy to define the first topology as a first subset of the hierarchy of nodes, after the hierarchy is generated, and generating a second topology corresponding to a second model, including identifying which of the nodes of the hierarchy to define a second subset of the hierarchy of nodes, the hierarchy after the hierarchy is generated, the second topology generated using a same hierarchy as was used to generate the first topology, the second topology different than the first topology, the second subset different than the first subset, the second model different than the first model, the nodes corresponding to computing resources of a business system, the computing resources interacting with one another to provide a business service of the business system, the first topology comprising the nodes of the first subset, the second topology comprising the nodes of the second subset;

evaluate the first model and the second model to generate evaluation results, including evaluating the first calculation units of the first topology and the second calculation units of the second topology within a single computational cycle; and determining whether the business system is performing properly to provide the business service using the evaluation results, wherein the hierarchy of nodes is organized over a plurality of levels, each node of the hierarchy corresponding to a configuration item, each node of the first topology having a first calculation unit for the first model, each node of the second topology having a second calculation unit for the second model, wherein generating the first topology and the second topology from the same hierarchy avoids duplication between the first topology and the first hierarchy and reduces overhead in generating the first topology and the second topology, and wherein evaluating the first calculation units and the second calculation units within the single computational cycle reduces redundancy in determining whether the business system is performing properly.

16. The method of claim 1, wherein redundancy in evaluating the first model and the second model is avoided due to the hierarchy of nodes being shared by both the first topology and the second topology.

17. The method of claim 1, wherein the first subset of the hierarchy of nodes of the first topology and the second subset of the hierarchy of nodes of the second topology are overlapping, non-identical subsets of the hierarchy of nodes.

18. The method of claim 17, wherein each node of the hierarchy of nodes that is present both in the first subset of the first topology and in the second subset of the second topology has both the first calculation unit for the first model and the second calculation unit for the second model.

19. The method of claim 18, wherein each node of the hierarchy of nodes that is present just in the first subset of the first topology and not in the second subset of the second topology has the first calculation unit for the first model and not the second calculation unit for the second model.

20. The method of claim 19, wherein each node of the hierarchy of nodes that is present just in the second subset of the second topology and not in the first subset of the first topology has the second calculation unit for the second model and not the first calculation unit for the first model.

* * * * *